United States Patent
Petty et al.

(10) Patent No.: US 7,241,526 B2
(45) Date of Patent: Jul. 10, 2007

(54) FUEL CELL MANIFOLD CABLE END CLAMP

(75) Inventors: Dale W. Petty, Wallingford, CT (US); Cynthia M. Phillips, Manchester, CT (US)

(73) Assignee: UTC Power Corporation, South Windsor, CT (US)

(*) Notice: Subject to any disclaimer, the term of this patent is extended or adjusted under 35 U.S.C. 154(b) by 513 days.

(21) Appl. No.: 10/802,026

(22) Filed: Mar. 16, 2004

(65) Prior Publication Data
US 2005/0208362 A1 Sep. 22, 2005

(51) Int. Cl.
*H01M 8/24* (2006.01)
*H01M 2/08* (2006.01)

(52) U.S. Cl. .......................... 429/37; 429/38
(58) Field of Classification Search ............. 429/37
See application file for complete search history.

(56) References Cited

U.S. PATENT DOCUMENTS

| | | | | |
|---|---|---|---|---|
| 4,345,009 A | * | 8/1982 | Fahle et al. | 429/37 |
| 4,692,391 A | * | 9/1987 | Hirota | 429/34 |
| 6,461,756 B1 | * | 10/2002 | Blanchet et al. | 429/37 |
| 6,696,193 B2 | * | 2/2004 | Bonk et al. | 429/34 |

* cited by examiner

*Primary Examiner*—Patrick Joseph Ryan
*Assistant Examiner*—Robert Hodge
(74) *Attorney, Agent, or Firm*—M. P. Williams

(57) ABSTRACT

A pair of reactant gas manifolds (11 and 12) on opposite sides of a fuel cell stack (7) are sealed to the fuel cells (14) and pressure plates (8) by means of pressure applied by load cables (17). The centers of the manifolds are prevented from having leakage between them and the end plates by means of a tensioning system comprising a plurality of pins (22) extending outwardly from the ends of the manifolds, and tensioning cables (23) extending around the pins in a closed loop and tensioned by a turnbuckle (24).

3 Claims, 2 Drawing Sheets

FUEL CELL MANIFOLD CABLE END CLAMP

TECHNICAL FIELD

This invention relates to clamping the ends of fuel cell reactant manifolds by drawing two manifolds towards each other on opposite sides of the fuel cell stack, by means of a tensioning cable wrapped around pins.

BACKGROUND ART

A fuel cell stack, part of a fuel cell power plant known to the prior art is illustrated in FIG. 1. In FIG. 1, the fuel cell stack 7 includes a pressure or end plate 8, a fuel inlet/outlet manifold 9, a fuel turn manifold 10, and air/coolant inlet/outlet manifold 11 and an air turn manifold 12. The manifolds 9–12 are sealed to the edges of the fuel cells 14 and the edges of the pressure plate 8 by means of foam gaskets, silicone rubber, and possibly other components, examples of which are shown in copending U.S. patent application Ser. No. 10/619,406, filed Jul. 15, 2003. The pressure plates are drawn together by tie rods 15, as is known. The manifolds are pressed to the stack by load cables 17. The air/coolant manifolds experience leakage near the center line of the stack 18 because the manifolds have a low profile (that is, a low top-to-bottom height as seen in FIG. 1) and are therefore not stiff enough to counter the seal preload and stack pressure loads, thereby deflecting enough to leak in the center.

In motor vehicle applications, the volume of the fuel cell power plant is severely limited so that the size of the manifolds as well as any corrective equipment, such as clamps, is highly restricted.

DISCLOSURE OF INVENTION

Objects of the invention include provision of a manifold seal for fuel cell power plant: which has a very low volume, and provides no increase in volume to a fuel cell power plant; which does not impede access to other components mounted on the fuel cell stack; which requires minimum machining; which is easy to assemble; which is easy to retrofit on existing fuel cell stacks; in which the camping force is easily adjusted.

According to the present invention, pins are inserted into the ends of fuel cell reactant gas manifolds, the pins extending outwardly from the surface of such ends, there being a clamping cable which is tensionable, wrapped around the pins. In accordance further with the invention, the pins have grooves, somewhat like pulleys, so as to retain the clamping cable. In still further accord with the invention, the clamping cable is joined into a complete loop by means of a turnbuckle, which can adjust the tensioning in the cable, with a lock nut to hold the adjustment once made.

Presence of the pins do not extend the overall length of the fuel cell stack because the pins are located between gas and water inlet and outlet pipes which extend outwardly from the fuel cell stack. The clamping force is easily adjustable by the turnbuckle. The cable may comprise a plastic coated wire rope, thereby providing a measure of electrical insulation with respect to adjoining parts. The clamping cable of the invention is simple, requires minimum machining, is easy to assemble and is easy to retrofit onto existing systems. If desired, the tensioning cable of the present invention can be tailored to allow pressure relief in response to detonation events.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
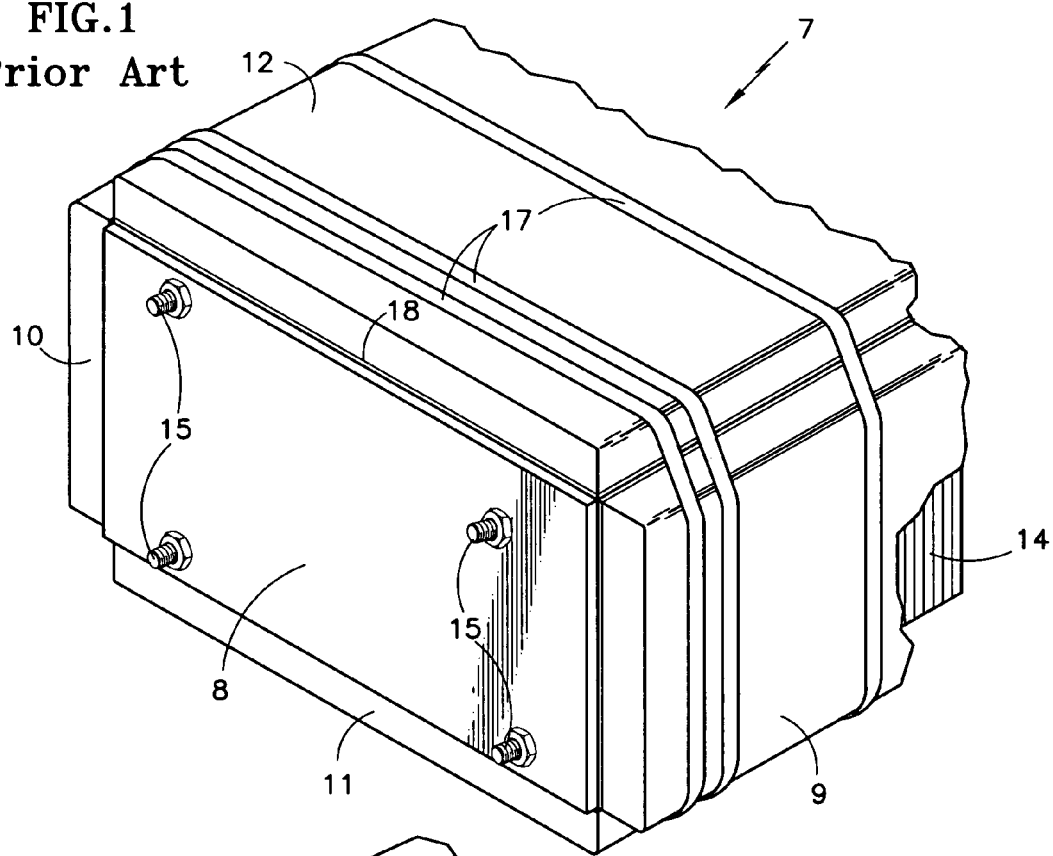
FIG. 1 is a fragmentary, partially broken away, simplified, stylized, perspective view of a fuel cell stack having manifold leaks.
Figure 2:
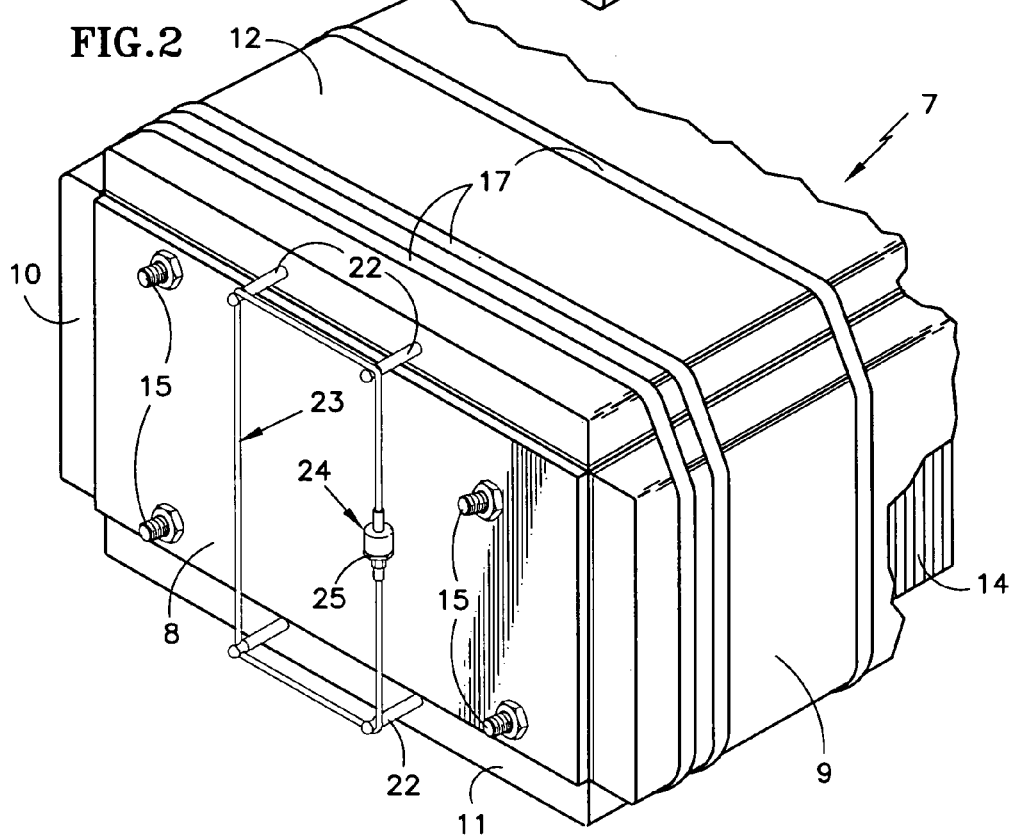
FIG. 2 is a fragmentary, partially broken away, simplified, stylized, perspective view of a fuel cell stack having pins and a clamping cable in accordance with the invention to prevent manifold leaks.

Referring to FIG. 2, four grooved pins 22 are bonded into holes provided in the ends of the manifolds 11, 12, there being a cable 23 wrapped around the pins 22 and closing upon itself at a turnbuckle 24 which has a locknut 25.

If desired, and proper spacing and clearance can be provided without interference with other apparatus on the pressure plates 8, the invention may be practiced utilizing a single pin 22 extending outwardly from the end of each related manifold.

One of the advantages of the present invention is that the pins can be located wherever there is room for them and the cable without interfering with other parts of the fuel cell stack. In fact the pins on one end do not have to be symmetrically aligned with the pins on the other end of the stack. The pins may be closer together on one end of the stack than they are on the other end of the stack. If desired, and if there is clearance near the center of the stack, only a single set of pins may be utilized; however, a pair of pins are preferred to provide adequate clearance for the turnbuckle for simple adjustment of the tension in the cable.

Figure 3:
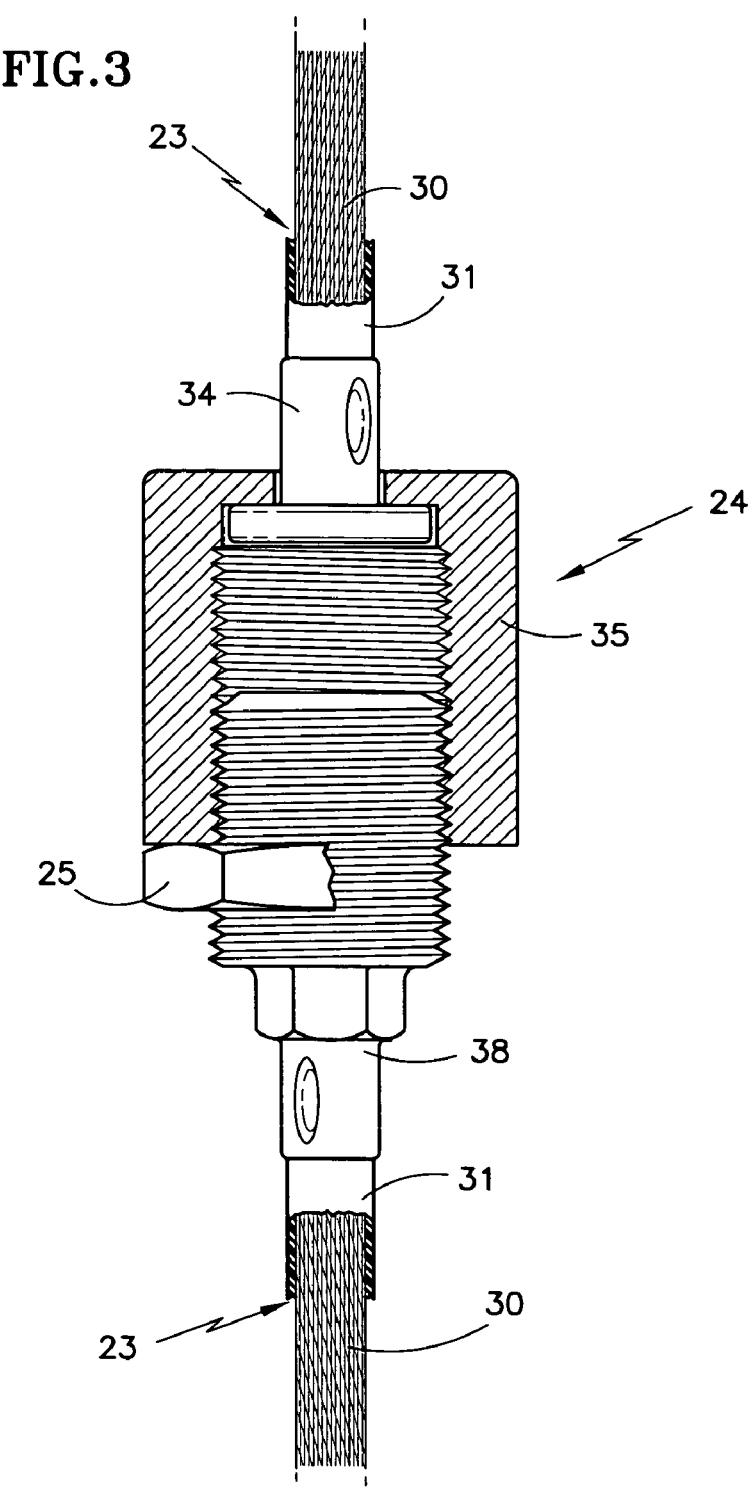
FIG. 3 is a partially sectioned, side elevation view of the turnbuckle and cable.
Figure 4:
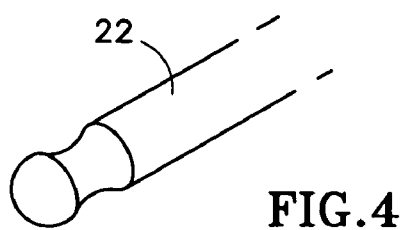
FIG. 4 is a fractional perspective view of a pin for use in the configuration of FIG. 2.

The turnbuckle 24 and lock nut 25 are illustrated in more detail in FIG. 3. The clamping cable 23 comprises a wire cable 30 with insulation 31 thereon. A collar 34 is crimped onto the cable 23 after a hollow threaded turnbuckle nut 35 is slipped over the collar. The turnbuckle nut 35 is free to rotate about the collar 34. A threaded stud 38 is crimped onto the other end of the cable and the lock nut 35 is threaded thereon. Thereafter, the turnbuckle nut 35 is threaded onto the stud 38 until the desired tension has been achieved. A pin 22 is shown enlarged in FIG. 4.

Instead of a coated cable, the tension may be provided by: a solid wire; a plastic, woven wire or composite strap; and the term "cable" is herein defined as any structure which can apply tension between fastenings on the manifolds. The term "pin" is herein defined to include screws, bolts, eyelets or any other structure on the manifolds which can support the tension provided by the cable.

The aforementioned patent application is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:
1. A fuel cell stack comprising:
   a plurality of contiguous fuel cells compressed between pressure plates by tie rods;
   at least one pair of manifolds for directing at least reactant gas into and out of said fuel cells, said at least one pair of manifolds being disposed on opposite sides of said fuel cell stack, said manifolds each having an end with an end surface adjacent to one of said pressure plates, said manifolds being held in gas sealing relationship to edges of said fuel cells and said pressure plates by means of seal materials and load cables under tension;
   at least one pin disposed in the end surface of each of said manifolds, said at least one pin extending outwardly from the end surface of the corresponding manifold; and
   a cable extending in a closed loop about said pins, said cable under tension, thereby drawing the pins and therefore the manifolds toward each other, whereby to overcome gas leakage through the seals at the interface of the manifolds with the pressure plates.

2. A fuel cell stack according to claim 1 wherein said cable has two ends which are drawn together by a tensioning turnbuckle.

3. A fuel cell stack according to claim 1 wherein there are two pine disposed in each end surface of each of said pair of manifolds, and said cable extends about four pins.

* * * * *